United States Patent
Canton

[11] Patent Number: 6,145,393
[45] Date of Patent: Nov. 14, 2000

[54] FLOATED GIMBAL OPTICAL PLATFORM

[76] Inventor: Dino Canton, 45 Crystal Beach Drive, Nepean ON K2H 5M6, Canada

[21] Appl. No.: 09/433,345

[22] Filed: Nov. 4, 1999

Related U.S. Application Data

[63] Continuation-in-part of application No. 09/200,763, Nov. 27, 1998.

[51] Int. Cl.[7] .......................... G01C 19/52; G03B 17/00; F16M 13/00
[52] U.S. Cl. ............................. 74/5.43; 74/5.46; 248/550; 248/660; 396/419
[58] Field of Search ........................... 74/5.43, 5.46; 248/550, 660; 396/419, 421, 428

[56] References Cited

U.S. PATENT DOCUMENTS

| | | |
|---|---|---|
| 2,856,776 | 10/1958 | Morgan et al. |
| 2,871,706 | 2/1959 | Fischer et al. |
| 3,020,768 | 2/1962 | Falk. |
| 3,226,984 | 1/1966 | Humphrey .................. 74/5.6 |
| 3,401,567 | 9/1968 | Boswell ..................... 74/5 R |
| 3,552,699 | 1/1971 | Baker. |
| 3,592,429 | 7/1971 | Miller et al. ............... 248/179 |
| 3,603,664 | 9/1971 | James ....................... 350/55 X |
| 3,747,418 | 7/1973 | Hoffman et al. ............ 74/5.43 |
| 3,885,443 | 5/1975 | Albert ........................ 74/5 R |
| 4,020,701 | 5/1977 | Brown et al. ............... 74/5 R |
| 4,143,466 | 3/1979 | Quermann. |
| 4,150,579 | 4/1979 | Vaughn ...................... 74/5.43 X |
| 4,258,578 | 3/1981 | Kennel ....................... 74/5.34 |
| 4,860,038 | 8/1989 | Thatcher et al. ........... 354/64 |
| 4,989,466 | 2/1991 | Goodman. |
| 5,103,089 | 4/1992 | Shimura et al. |
| 5,366,193 | 11/1994 | Lindsay. |
| 5,389,972 | 2/1995 | Cartoni. |
| 5,410,232 | 4/1995 | Lee ............................ 318/568.11 |
| 5,542,762 | 8/1996 | Nakanishi et al. .......... 366/228 |
| 5,954,310 | 9/1999 | Soldo et al. ................ 248/660 |

*Primary Examiner*—Allan D. Herrmann
*Attorney, Agent, or Firm*—Pascal & Associates

[57] ABSTRACT

The invention is a floated gimbal instrument platform that provides a stable optical path for optical instruments. The instrument platform has an outer vessel with a transparent viewing port, an inner vessel also with a transparent viewing port, a transparent suspending fluid filling the outer vessel and in which the inner vessel floats in neutral buoyancy, an optical instrument secured inside the inner vessel, spacing studs which centrally position the inner vessel within the outer vessel, and jets which align the second viewing port with the first viewing port, the jets being used to rotate the inner vessel in the suspending fluid. Any misalignment between the viewing ports can be compensated by rotating the inner vessel and any translational forces applied to the platform is dampened by the fluid, thereby eliminating jitter.

25 Claims, 13 Drawing Sheets

FLOATED GIMBAL OPTICAL PLATFORM

This application is a continuation-in-part of U.S. application Ser. No. 09/200,763 filed Nov. 27, 1998.

FIELD OF THE INVENTION

This invention relates to stabilized platforms and in particular to stabilized platforms which house optical instruments.

BACKGROUND TO THE INVENTION

Sensitive optical instruments are often used in turbulent and dynamic environments. It is critical in these applications that the instrument remain at a user-established attitude in situations where the attitude of the platform to which the instrument is mounted is constantly changing. Applications such as filming underwater scenes where the camera is mounted on a submersible vehicle which roams the ocean floor is a typical scenario which highlights the need for a stable optical platform. Similarly, optical data links between ships require stable instrument platforms to maintain the transmission and reception equipment at a constant attitude despite the rolling and pitching of the ocean. Other instruments, such as laser range finders and laser targetting systems also require stable platforms to properly operate.

The prior art is replete with stabilized platforms that are mechanically gimbaled, thereby allowing the centrally positioned instrument (such as a compass) to remain at a desired attitude despite tilting or rotation of the surrounding structure that supports it. The mechanical gimbal allows the instrument mounted therein to maintain a constant attitude relative to an external frame of reference by means of mechanical or electromechanical linkages.

Referring to the prior art, U.S. Pat. No. 3,592,429 shown in FIG. 1 discloses a mechanically gimbaled platform for instruments. The device comprises a U-shaped base 1 mounted on a support 2 and a U-shaped cradle 3 swingably mounted on the base 1. The base comprises two interconnected units 4, 5 disposed one above the other and each including pistons rotatably mounted in liquid filled cylinders 6 (only the set in the uppermost portion is shown). The lowermost of the two units 5 is coupled to a support 2 such as a tripod (only two legs of which are shown), with the uppermost unit 4 secured to the underface of the base bottom. The mechanical linkages integral to this device isolate an instrument mounted in the U-shaped cradle 3 from any roll, pitch, or yaw movements imparted on the platform. The platform is thus essentially, but not completely, stable and free from outside turbulence. However, such a mechanically gimbaled platform typically requires many component parts with tight mechanical tolerances. This results in high manufacturing costs and a lowered time between failures. Also, should the instrument mounted in the U-shaped cradle 3 become misaligned, it cannot be corrected as there is no alignment means incorporated into the device.

Platforms for optical instruments are well known in the prior art, an example of which is described in U.S. Pat. No. 4,860,038 which is illustrated in FIG. 2. This underwater bubble camera comprises a substantially spherical housing 7 which is impermeable to water and includes a viewing port 8, a support member 9 interconnecting the spherical housing to a vehicular base, a camera 10 mounted in the spherical housing, and electromechanical means 11 connected to a cockpit (not shown) to facilitate movement of the camera by a user positioned in the cockpit. While this invention is very useful, human intervention is required to maintain the camera at a constant attitude when the vehicular base is rotated due to external forces acting on the vehicle.

In an attempt to overcome some of the problems inherent in mechanically gimbaled instruments platforms, floated gimbal platforms were developed as disclosed in U.S. Pat. No. 4,258,578 which is illustrated in FIG. 3. This device is designed for high "g" environments and serves to reduce or eliminate bending forces present in mechanically gimbaled systems, by floating the instrument platform 12 in a hollow sphere 13 such that the platform is neutrally buoyant in the flotation fluid. By eliminating bending forces, this device reduces measurement errors associated with the inertial instruments mounted on the instrument platform. Although the device is effective in eliminating bending forces, the structure by which this is accomplished is unduly complex. Further, the device is not optimized for mounting optical devices. Finally, the device does not include means for re-positioning the internally floated platform should it adopt an undesirable attitude.

SUMMARY OF THE INVENTION

The present invention serves to overcome the deficiencies of the prior art by providing a floated gimbal optical platform. It is therefore the primary object of the present invention to provide an instrument platform which is simple in design and which incorporates attitude adjustment means.

The above object is achieved by providing a floated gimbaled optical platform comprising:

a vehicular mounted base;

a hollow sealed outer vessel fixed to the base and having a first optically transparent viewing port;

a hollow sealed inner vessel assembly centrally positioned in the outer vessel comprising: a second optically transparent viewing port aligned with the first optically transparent viewing port; and an optical instrument mounted within the inner vessel assembly and optically aligned with the first transparent viewing port;

an optically transparent suspension fluid separating the inner vessel assembly and outer vessel and having a density substantially equal to the inner vessel assembly;

means to assist in centrally positioning the inner vessel assembly within the outer vessel;

means to detect misalignment of the second transparent viewing port with the first transparent viewing port; and means to rotate the inner vessel assembly within the optically transparent suspension fluid;

wherein detected misalignment between the first and second transparent viewing ports is corrected by rotating the inner vessel assembly;

and wherein the centre of gravity of the inner vessel assembly is substantially located at the physical centre of the inner vessel assembly;

and wherein the inner vessel assembly floats in the optically transparent suspension fluid in substantially neutral buoyancy.

The invention provides a new and useful combination in the form of a floated gimbal optical platform which advances the art of gyroscopically stabilized instrument platforms. A floated gimbal platform of simple design which integrates an optical device and attitude adjustment means is provided which overcomes the deficiencies of the prior art. The simple design serves to maintain the optical device at a generally fixed attitude, but should some drifting of the inner vessel assembly occur due to rotational movement of the outside vessel, the attitude of the inner vessel assembly can be quickly and automatically detected and corrected. The design places the centre of gravity of the inner vessel assembly at its physical centre, so that any acceleration applied to the platform will be applied symmetrically to the inner vessel, thereby eliminating rotation of the inner vessel assembly.

DESCRIPTION OF THE PREFERRED EMBODIMENT

Figure 1:
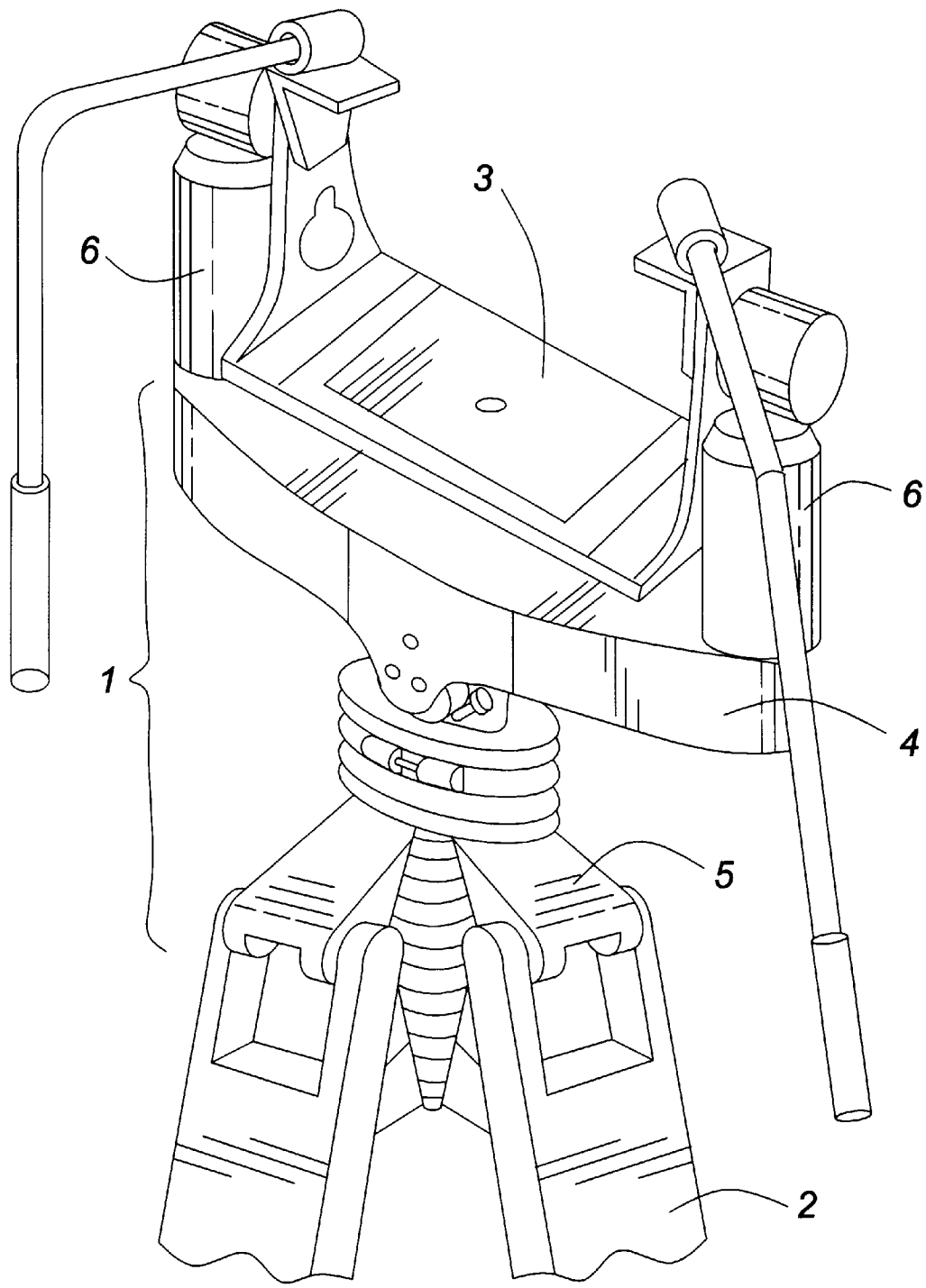
FIG. 1 is a mechanically gimbaled platform in accordance with the prior art.
Figure 2:
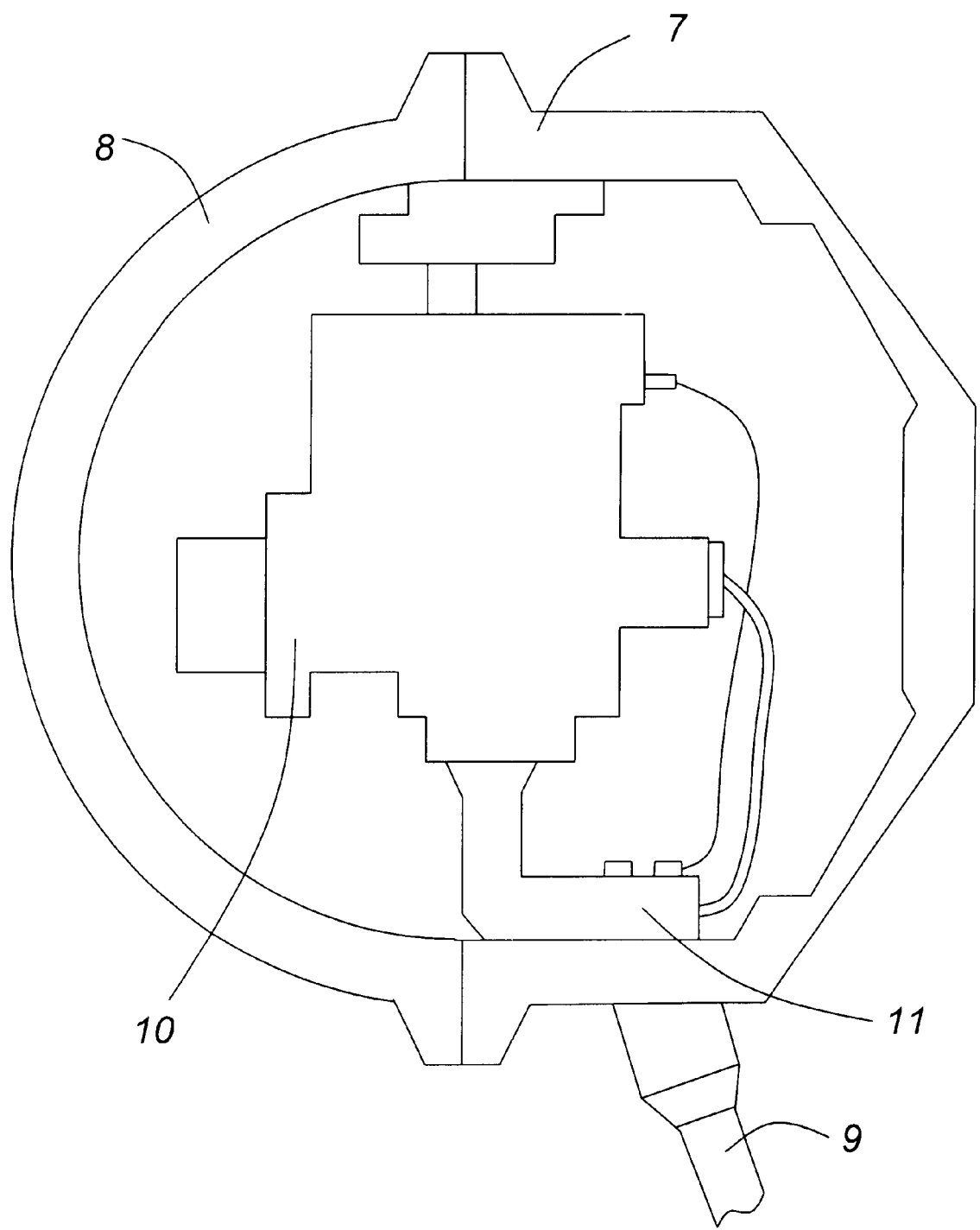
FIG. 2 is an optical platform in accordance with the prior art.
Figure 3:
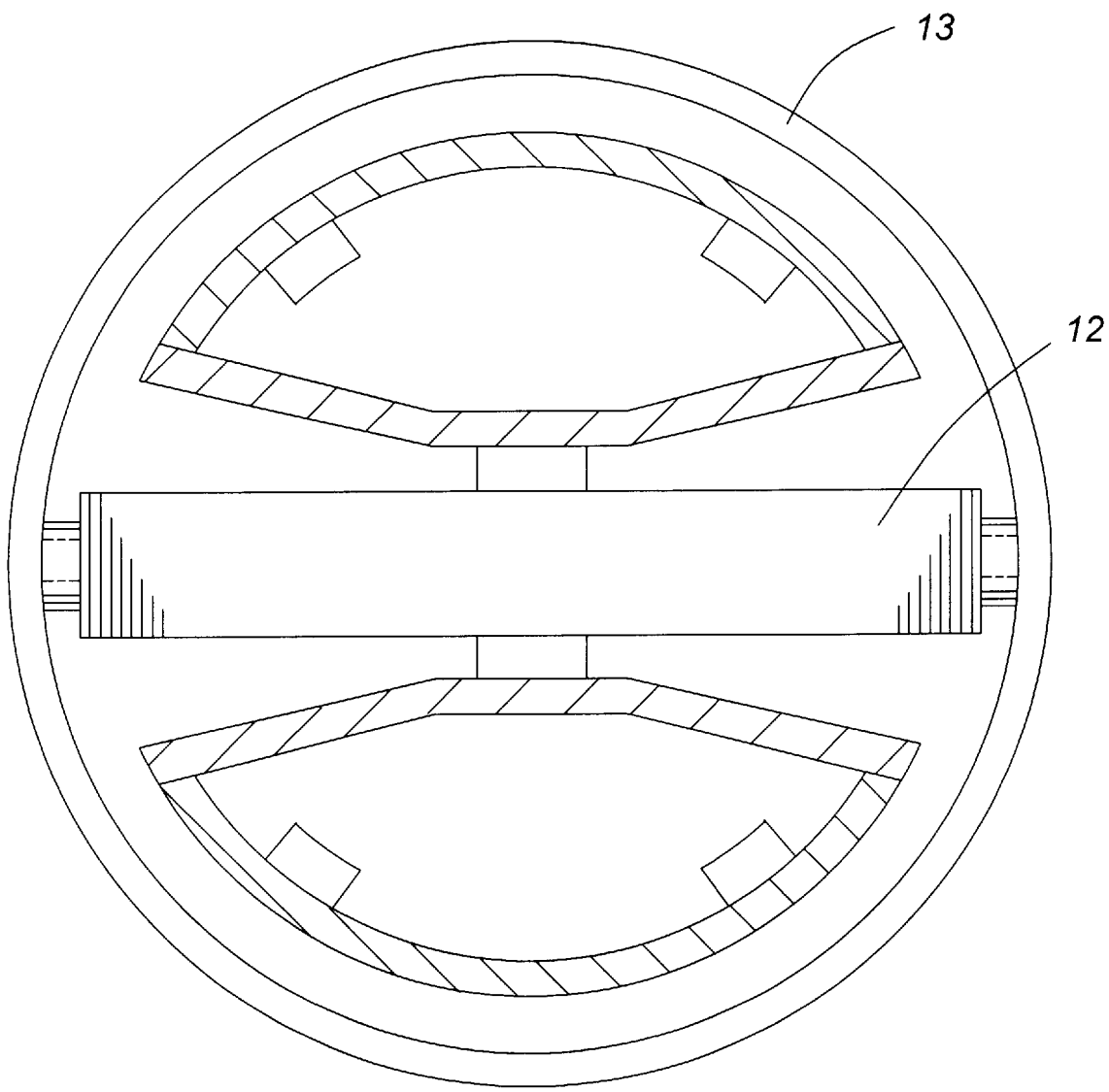
FIG. 3 is a floated gimbal platform in accordance with the prior art.
Figure 4:
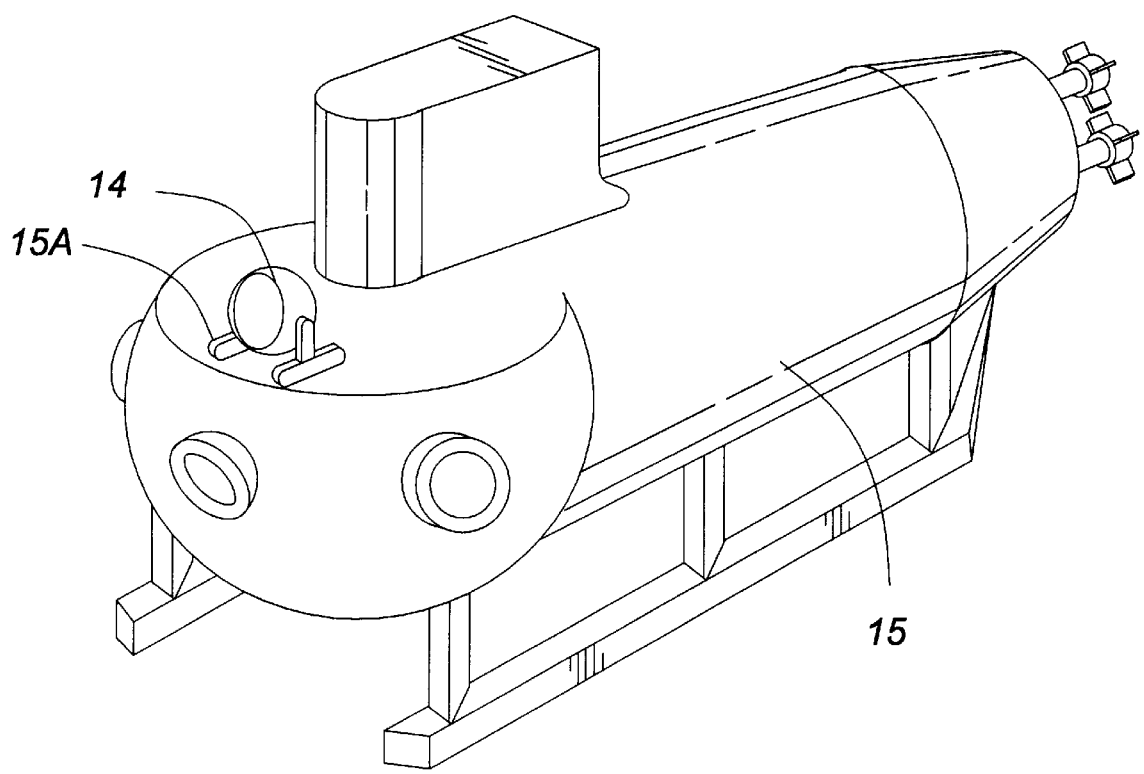
FIG. 4 is a perspective view of the present invention.

Referring to FIG. 4, a perspective view of the present invention is shown, as it would appear mounted on a vehicular platform. The floated gimbaled optical platform 14 is mounted on a submersible vehicle 15, but it will be understood by those skilled in the art this system 14 could be mounted on an aircraft, automobile, helicopter, or other vehicular device using a vehicular mounted base 15A.

Figure 5:
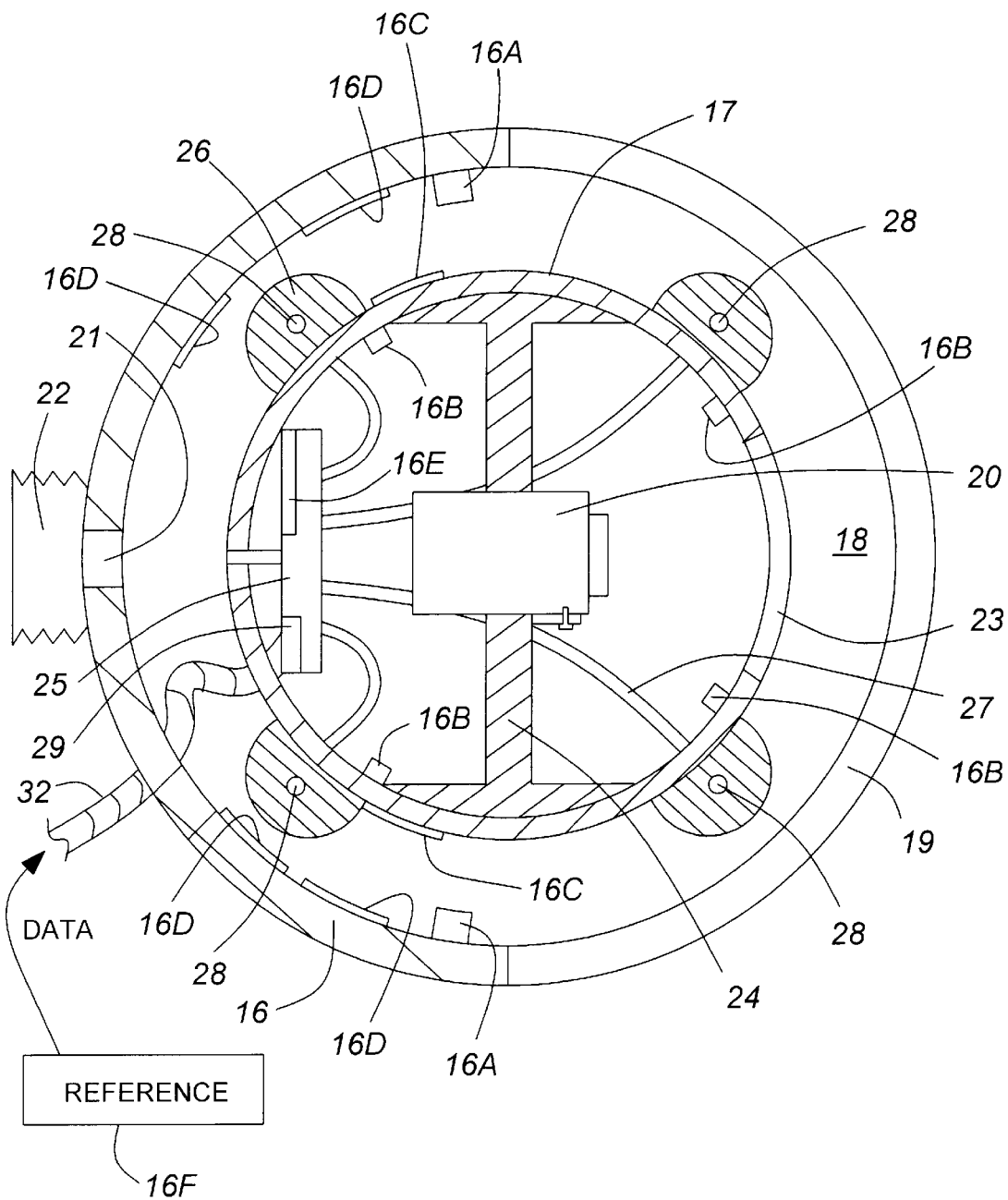
FIG. 5 is a cross-sectional view of the present invention.

A more detailed look at the preferred embodiment of the invention is illustrated in FIG. 5. The invention's main component parts include a hollow, sealed outer vessel 16 and a hollow, sealed inner vessel assembly 17 which are separated by a suspension fluid layer, generally shown as 18. The outer vessel 16 is substantially spherical in shape and liquid-tight to ensure that the suspension fluid 18 cannot escape.

Integral to the outer vessel 16 is a first viewing port 19 that is transparent to the wavelengths of light required by the optical instrument in use (shown as 20). A small bore 21 is located on the outer vessel 16. This bore 21 provides a channel for the suspension fluid 18 to enter bellows 22 which are sealed against the surface of the outer vessel 16. Bellows 22 act as a reservoir for the suspension fluid 18. In the event that different temperatures are encountered which cause the suspension fluid 18 to expand or contract, bellows 22 accommodate these temperature variations, by allowing the fluid to expand or contract. At high temperatures, the suspension fluid 18 will expand whereas at lower temperatures the suspension fluid 18 will contract. In each case the bellows 22 will expand or contract to compensate for the volumetric changes associated with the contraction or expansion of the suspension fluid 18.

The inner vessel assembly 17 is centrally positioned in the outer vessel 16 and is neutrally buoyant in the suspension fluid 18. The inner vessel assembly 17 is also liquid-tight to prevent suspension fluid 18 from entering the interior cavity which houses the optical device 20. The inner vessel assembly 17 also includes a second viewing port 23 which is also optically transparent to the wavelengths of light used by the optical device 20, a mounting bracket 24 to secure the optical device 20, and means, to be described later, contained in housing 25, for rotating the inner vessel assembly.

It should be noted that the centre of gravity of the inner vessel assembly 17 is located at the physical centre of the inner vessel assembly 17. This can be accomplished by judiciously locating the optical device 20 and rotating means 25A within the inner vessel assembly 17. However, should the size and configuration of these items shift the centre of gravity, balancing weights (not shown) can be attached to the inner walls of the inner vessel assembly 17 so that the centre of gravity of the inner vessel assembly 17 can be relocated to its physical centre. Such weights can take the form of adjustable screws or other weights that can be adjusted to locate the centre of gravity at the physical centre of the assembly 17. With the centre of gravity and the physical centre coincident, the inner vessel assembly will not occur if acceleration forces are applied to the floated platform.

Located on the outside surface of the inner vessel assembly 17 are spacer studs 26 whose function is to centre the inner vessel assembly 17 within the outer vessel 16. These spacer studs 26 are either coated or constructed using a low-friction material such as polytetrafluoroethylene marketed under the trade-name Teflon. This low-friction material will reduce the drag created by any contact between the outer vessel and the inner vessel when the inner vessel is rotated due to movements of the vehicle to which the platform is attached. The preferred embodiment comprises eight spacer studs 26 which are preferably placed at approximately opposite points on the x, y and z axis of the inner vessel assembly. However, a minimum of four spacer studs will accomplish the end of centering the inner vessel assembly 17. The height of the spacer studs 26 is such that they do not normally touch the interior cavity of the outer vessel 16, but instead allow a thin layer of suspension fluid 18 to pass between spacer studs 26 and the inner wall of the outer vessel 16.

The final component of the floated platform is the suspension fluid 18. The suspension fluid 18 is selected so that it is of approximately the same density as the inner vessel assembly 17, and as a result the inner vessel assembly 17 is able to float in substantially neutral buoyancy. The suspension fluid 18 must also have similar optical qualities as the viewing ports 19, 23 in that the fluid must also be transparent to the wavelengths of light required by the optical device 20. The fluid 18 is preferably of low viscosity to reduce drag forces caused by any rotation of the outer vessel 16. The suspension fluid is preferably a liquid fluorinated hydrocarbon such as the product marketed under the trade-name Florinert. Mineral oil or any other low viscosity, optically transparent fluid would also be satisfactory.

In operation, the second viewing port 23 is aligned with the first viewing port 19 provide a continuous optical path for the optical instrument 20. When the outer vessel 16 is moved relative to the inner vessel assembly 17, drag on the inner vessel assembly 17 may occur due to the mechanical coupling between the suspension fluid and the outer surface of the inner vessel assembly 17. As a result, over time the viewing port 23 may become misaligned with the viewing port 19. A stabilizer subsystem 19A to detect and correct this misalignment is required and is incorporated into the present invention. With respect to detection, detection means can be induction coils 16A which are strategically positioned on the outer vessel in relation to the x, y and z axis of the outer vessel 16 with corresponding antennae 16B located in the inner vessel assembly 17. Each induction coil 16A would generate a modulated signal occupying a different portion of the electromagnetic spectrum which would be received by each of the antennae located in the inner vessel 17. Fluctuations in the amplitude of the modulated signal resulting from movement of the inner vessel would be measured at each antennae location (i.e. each antenna receives three inputs) to determine the offset of the two viewing ports 19, 23. It should be noted that the induction coils 16A can be positioned on the inner vessel with the corresponding antennae 16B on the outer vessel. Alternatively, the change in capacitance between corresponding conductive plates 16C, 16D positioned on the outer vessel 16 and the inner vessel assembly 17 in relation to the x, y and z axis could be measured to determine any movement of the inner vessel.

A third possible way of determining the position of the viewing port 23 relative to the viewing port 19 entails the use of an internal gyroscopic system 16E contained within the inner vessel assembly 17. The internal gyroscopic system 16E within the inner vessel assembly 17 can detect and determine the attitude of the inner vessel assembly. This data, in conjunction with an indication of the attitude of the outer vessel, can be used to determine the relative positions of both the inner and outer vessels. A reference gyroscopic system 16F located outside the inner vessel can be used to find the attitude of the outer vessel. Alternatively, the induction coil/antenna system described above can provide the outer vessel attitude data. Either way can be used to find the outer vessel attitude data. This data, along with the inner vessel attitude data from the internal gyroscope system 16E inside the inner vessel, yields the relative positions of both the inner and outer vessels. Any misalignment between the viewing ports 19 and 23 can therefore be easily detected.

It should be noted that any system which determines the attitude of the inner vessel relative to the outer vessel of vice versa will be suitable for detecting a possible misalignment between the viewing ports 19 and 23. Preferably, such a system would have three components—an internal attitude determining subsystem 40A, an external attitude determining subsystem 39A, and an arbitration subsystem 39B which determines whether there is a misalignment between the viewing ports. The internal attitude determining subsystem determines the attitude of the inner vessel assembly 17. The external attitude determining subsystem determines the attitude of the outer vessel assembly. Between these two subsystems, any misalignment can be found by the arbitration subsystem 39B. Thus, a reference gyroscopic system 16F outside the inner vessel in conjunction with either the conductive plate system described above or the inductive coil/antenna system also described above would fill this requirement. Alternatively, an internal gyroscopic system 16E in conjunction with either the coil or the plate system described previously can also be used. The arbitration subsystem 39B which receives the attitude data generated by the internal and external attitude subsystems arbitrates between these two sets of data to determine misalignments. Such an arbitration subsystem can take the form of either a general microprocessor 29 or a dedicated microcontroller, both with suitable software.

Figure 6:
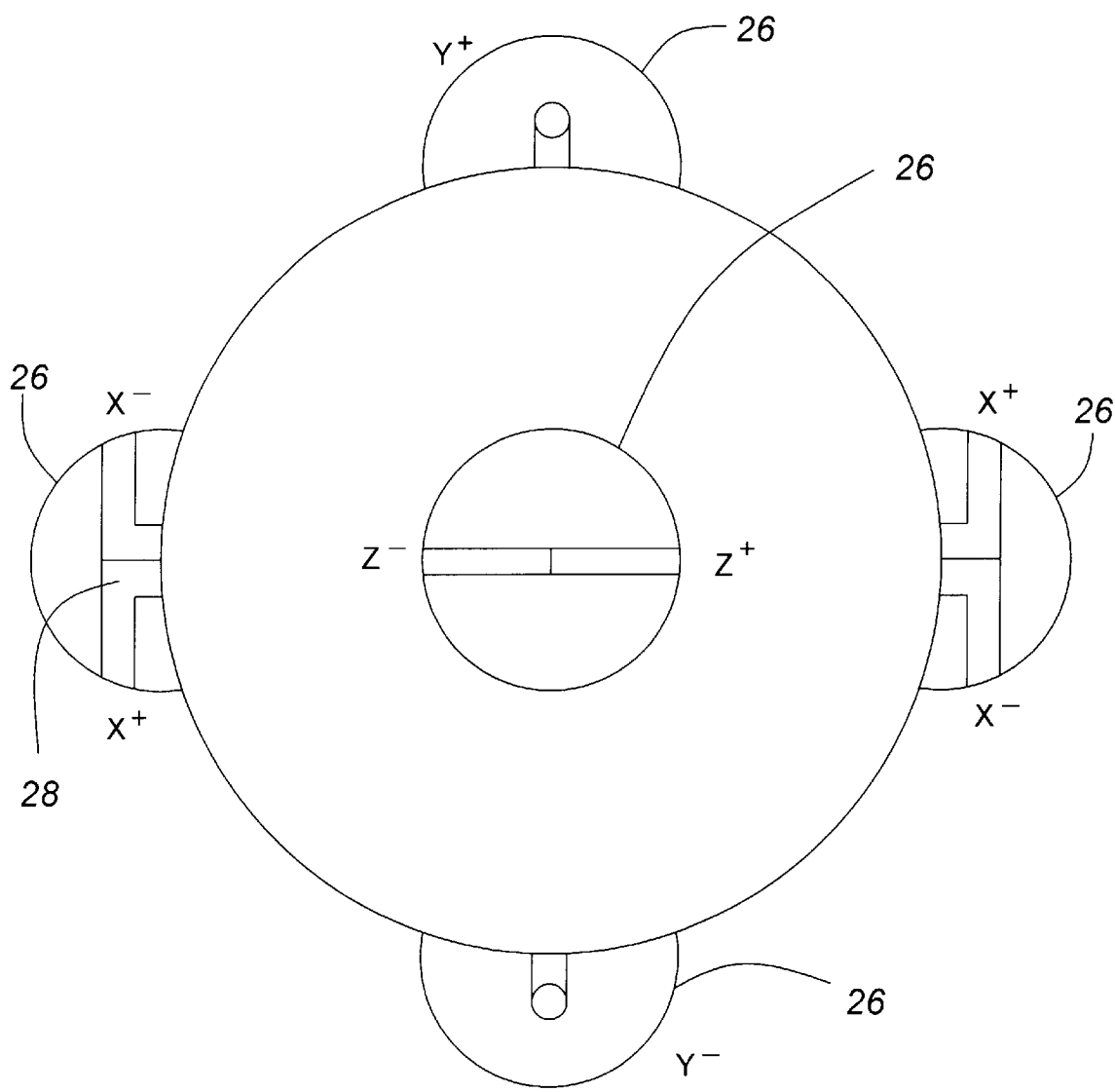
FIG. 6 is a top view of one component of the rotation means.
Figure 8:
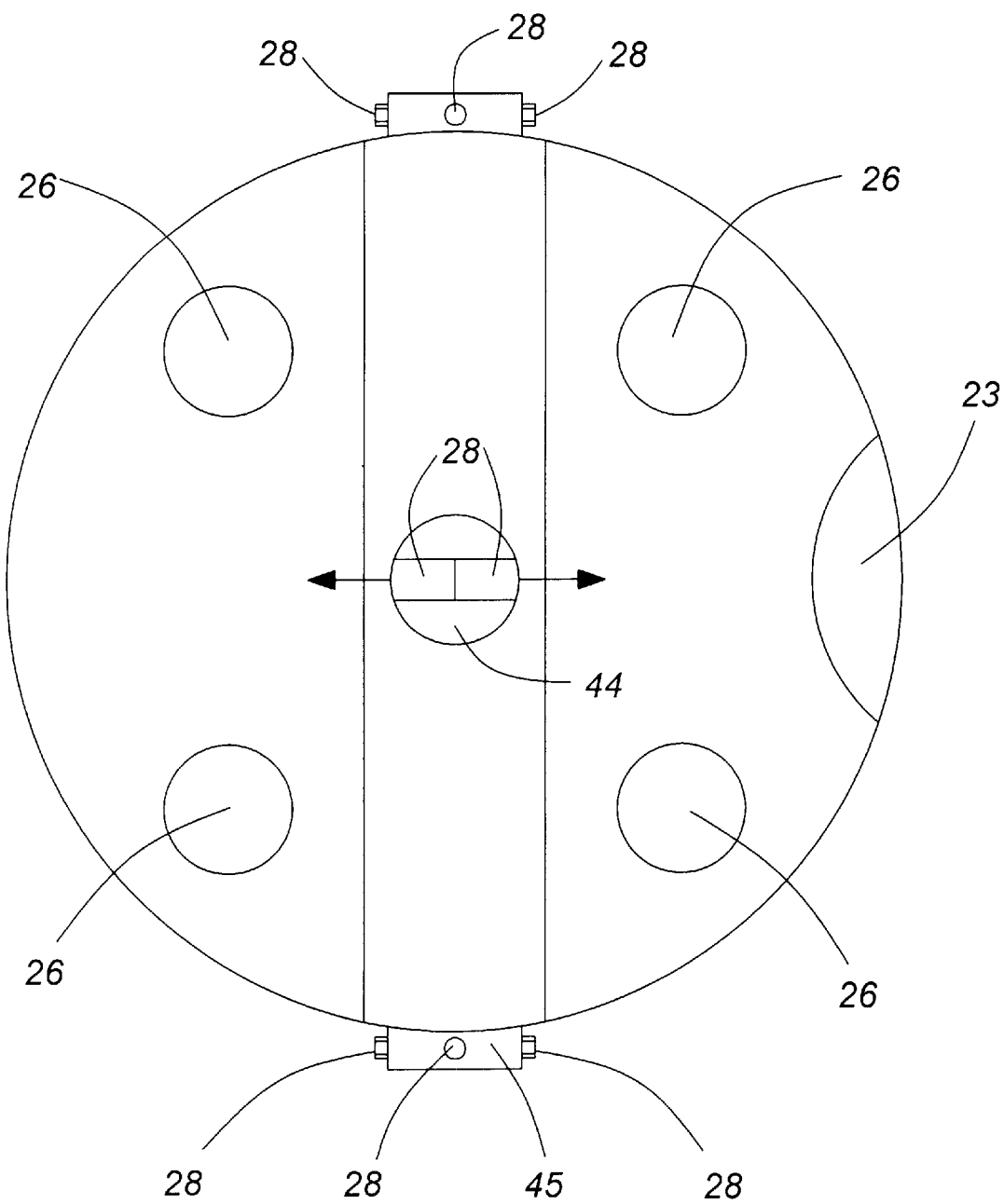
FIG. 8 is a side view of the inner vessel detailing the positioning of the ejector nozzles.
Figure 9:
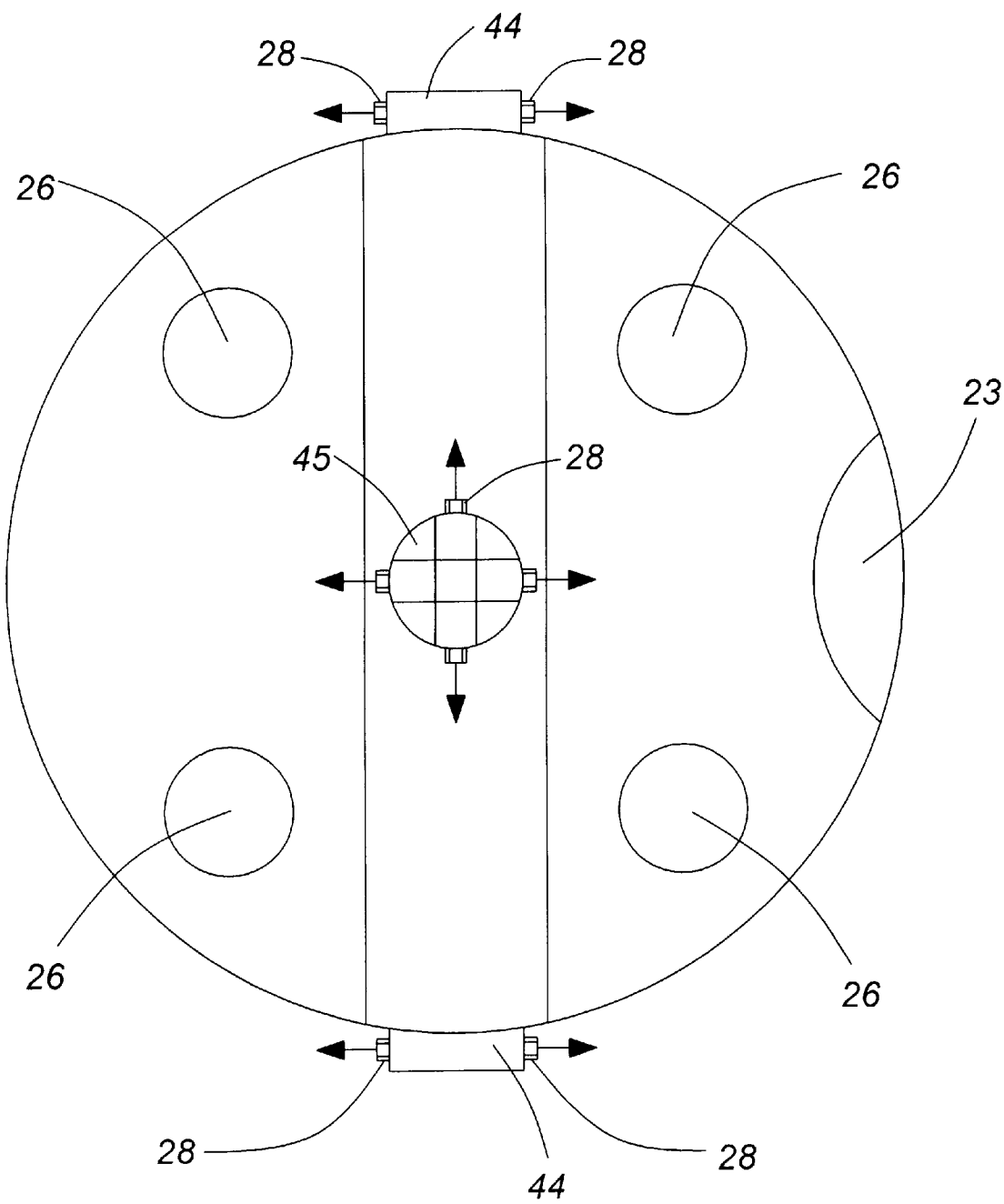
FIG. 9 is a top view of the inner vessel detailing the positioning of the ejector nozzles.

In any case, a detected misalignment and the attitude and positioning data associated with the misalignment would be fed to the correcting means contained in housing 25 to initiate action to rotate the inner vessel assembly into the required position. The correcting means consists of a microprocessor 29 and a pump (shown as 29 and 30 respectively in FIG. 7) contained in housing 25. Tubing 27 extends from the pump 30 to solenoid valves 31. The pump drains in fluid through an inlet A pictured in FIG. 5. From the solenoid valves, the fluid pumped by pump 30 is ejected though ejector nozzles 28. FIG. 6 details an embodiment wherein the ejector nozzles 28 are integrated in the spacer studs 26. However, for ease of manufacture, the ejector nozzles are preferrably deployed in a ring that bisects the inner vessel as shown in FIGS. 8 and 9. The correction means utilizes vectored thrust, wherein suspension fluid 18 is directed to ejector nozzles by the pump working in cooperation with a control algorithm integral to the microprocessor which receives and interprets data from the detection means described above. As shown in FIGS. 8 and 9, a pair of ejector nozzles are deployed back to back in a two nozzle housing 44 one housing being placed on each side of the inner vessel. On the top and bottom of the inner vessel, a housing 45 is placed, the housing 45 containing four ejector nozzles. In the embodiment having ejector nozzles within the studs 26, opposing nozzles 28 are positioned in each spacer stud 26. By controlling the flow of suspension fluid 18 to specified nozzles the desired rotational force is imparted to the inner vessel assembly 17. The positioning of the nozzles should be such that ejection of fluid through selected nozzles rotates the inner vessel. Referring to FIGS. 8 and 9, it can be seen that ejection of fluid through any of the nozzles causes the inner vessel to rotate through one of its major axes. In FIG. 9, ejection of suspension fluid from the nozzle housing 44 rotates the inner vessel clockwise or counterclockwise. Similarly, ejecting fluid out of any one of the four nozzles on nozzle housing 45 rotates the inner vessel about a selected axis.

Figure 7:
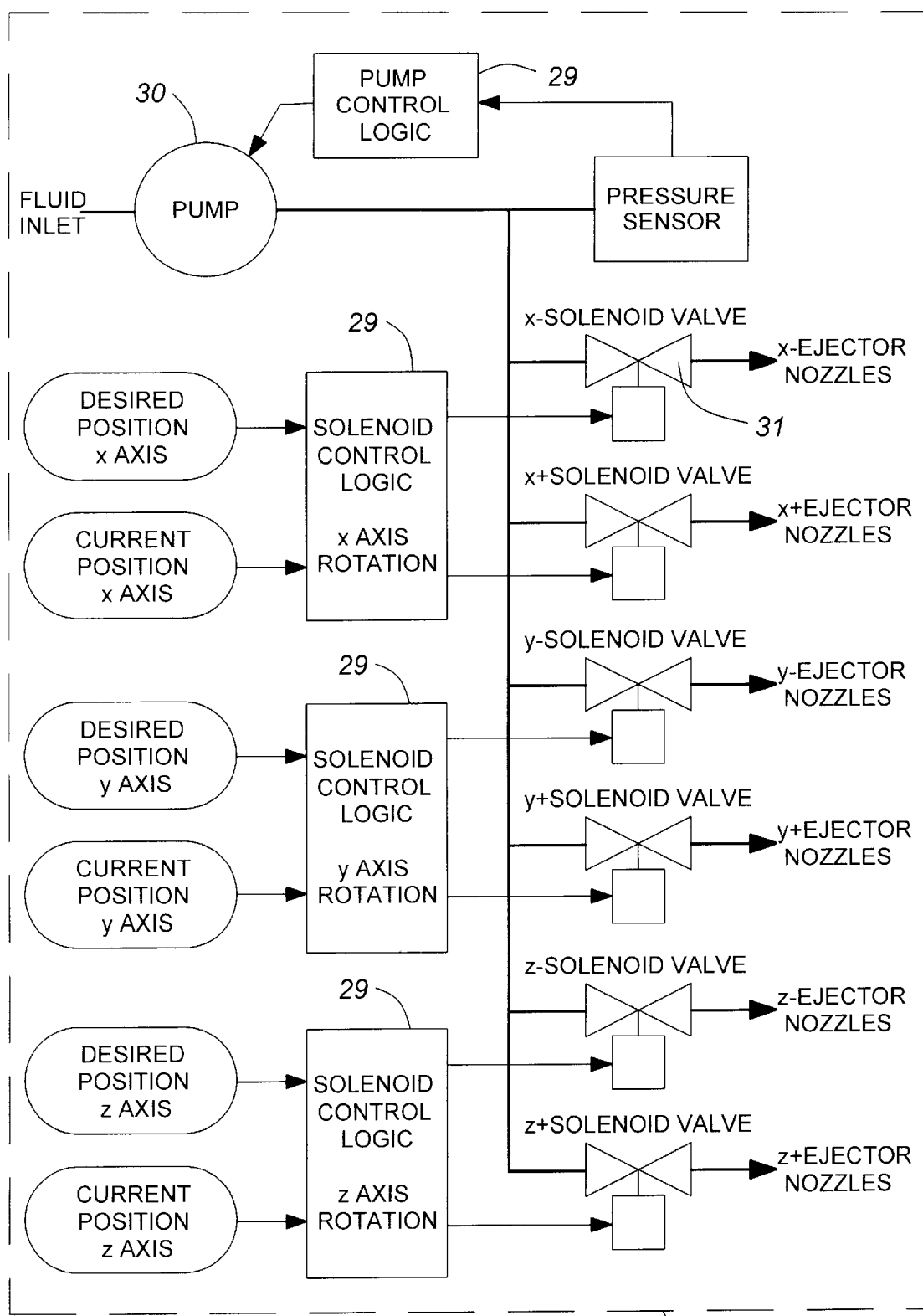
FIG. 7 is a block diagram of the inner vessel assembly rotation means.

With reference to FIG. 7, a diagrammatic overview of the correction means is outlined. Based on input from the detection means described earlier, microprocessor 29 (which includes both the pump control logic and the solenoid control logic) controls pump 30 and solenoid valves 31 to direct suspension fluid 18 to the desired ejector nozzle 28. One of six ejector nozzle can be chosen representing desired movement of the inner vessel assembly 17 in the x+, x−, y+, y−, z+ and z− direction respectively. While the ejector nozzles are used for correcting the alignment between the first viewing port 19 and the second viewing port 23, the nozzles can also be used to position the first viewing port 19 relative to the second viewing port 23. Thus, the inner vessel can be pointed to observe through any portion of the hemisphere of the first viewing port 19.

It should be noted that power required by the correcting means along with the data being transmitted to/from the optical device 20 are facilitated by cord 32 (shown in FIG. 5). Cable 32 is extremely lightweight and loosely extends between the outer vessel 16 and the inner vessel assembly 17 to allow the inner vessel assembly 17 to rotate freely. It should also be understood that rotation of the inner vessel assembly 17 may be manually engaged by a user through control signals sent to the microprocessor by way of cable 32.

Equally satisfactory means for repositioning the inner vessel assembly 17 include magnetic deflection/attraction, electrostatic repulsion, or electrostatic attraction. Using the magnetic deflection/attraction approach, a first set of electromagnets 17A are positioned on the outer vessel 16 and a second inner set of electromagnets 17B are positioned on the inner vessel assembly 17 and, as directed by microprocessor 29 are selectively turned on and off to cause the inner vessel assembly 17 to rotate, to realign viewing port 23 with viewing port 19.

Figure 10:
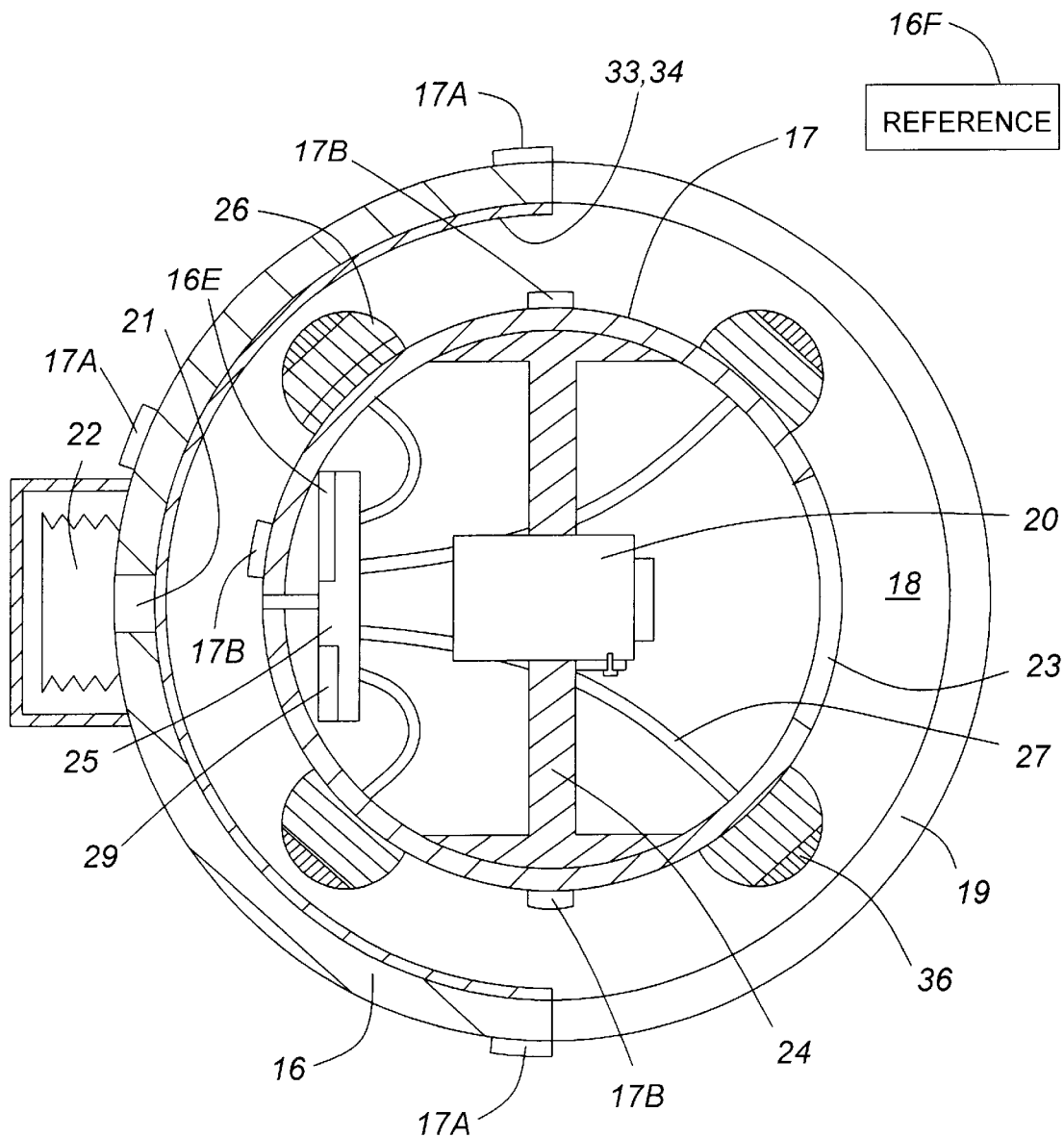
FIG. 10 is a cross sectional view of the present invention using an alternative data link.
Figure 11:
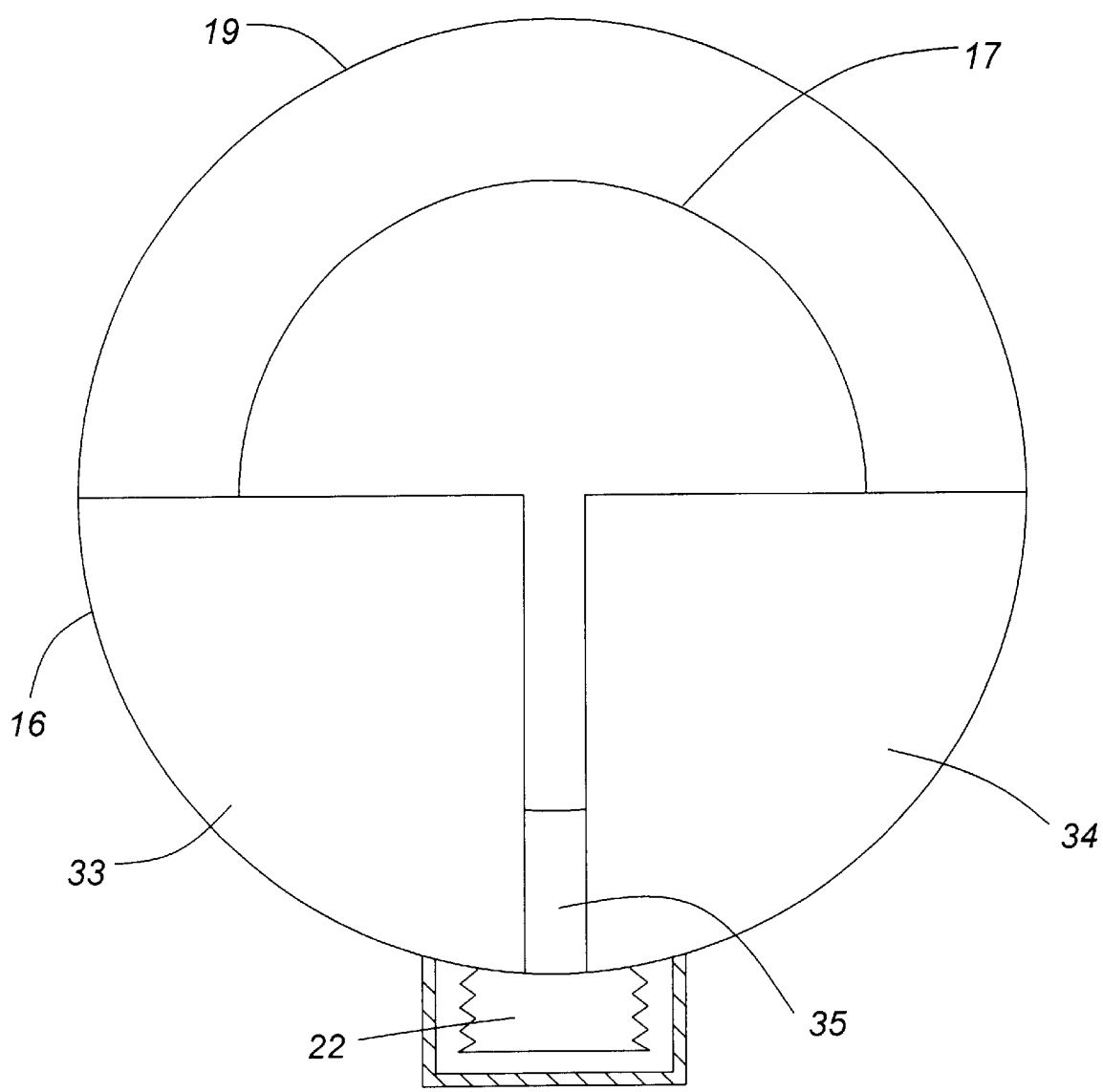
FIG. 11 is a top cut-away view of the embodiment illustrated in FIG. 8 showing the positioning of the data link conductive plates.

As an alternative to the cord 32, another embodiment of a data link is illustrated in FIG. 10. This embodiment utilizes two electrically conductive data link plates 33, 34, lining the inside of the outer vessel 16. A top cut-away view of the platform is illustrated in FIG. 11. As can be seen from FIG. 11, each of the data link conductive plates 33, 34, covers about half of the vessel 16 with a small gap 35 separating the two data link conductive plates. It should be noted that FIG. 11 does not show all the details of the invention but merely illustrates the placement of the data link conductive plates relative the gap 35 and the bellows 22.

In conjunction with the two data link conductive plates 33, 34, each of the spacer studs 26 now have a contact surface 36 through which power and data signals are transmitted to and from the inner vessel 17. The power and data are transmitted by having one data link conductive plate 33 carry a positive signal of the power and having the other data link conductive plate 34 carry the negative power signal.

In this embodiment, a minimum of one spacer stud is always in contact with each conductive plate 33, 34. Data signals are multiplexed with the power signals using well-known means such as frequency division multiplexing, thereby requiring only one transmission medium for both data and power.

Since at least one spacer stud is always in contact with each data link conductive plate 33 or 34, the inner vessel is always in contact with a positive plate and a negative plate. Data transmission and reception by the inner vessel is also accomplished through the contact surface 36 of the spacer studs 26. Suitable circuitry connected to the contact surface 36 such as that illustrated in FIG. 10, allows both transmission and reception of data signals by the inner vessel 17.

Figure 12:
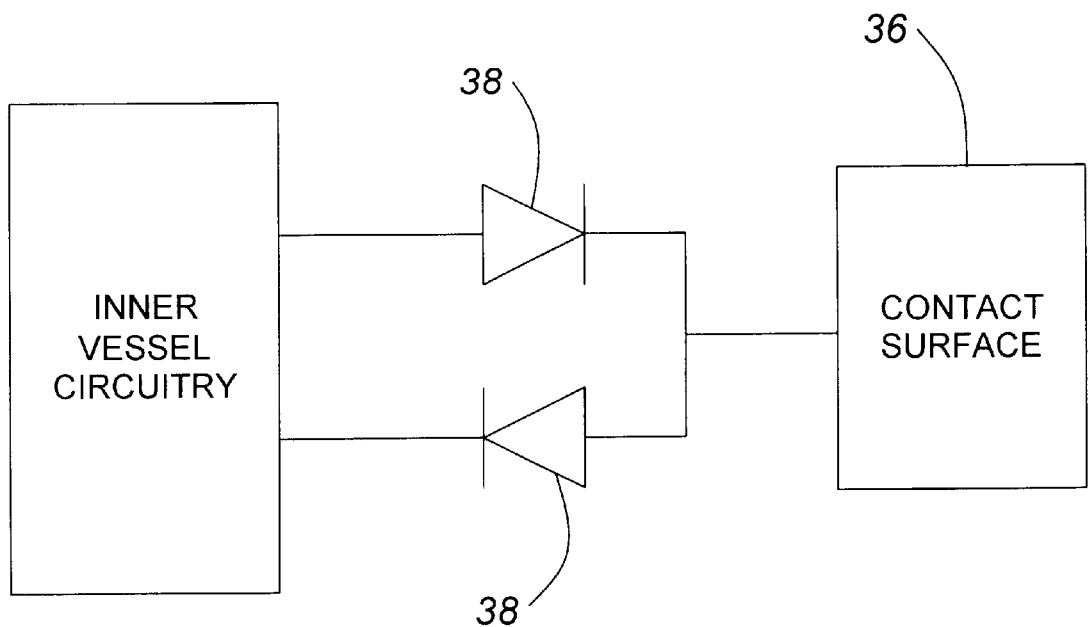
FIG. 12 is a schematic diagram of circuitry used to regulate the direction of data in the embodiment illustrated in FIG. 8.

The circuitry of FIG. 12 also allows all the studs to receive both positive and negative power signals. The use of diodes 38 regulates the direction of the signals between the circuitry within the inner vessel 17 and the contact surface 36.

This embodiment of a power and data link 43 dispenses with the cord 32 and replaces it with the above mentioned data link conductive plates and contact surfaces on the space studs. It requires constant contact between some of the spacer studs and the data link conductive plates 33, 34. It avoids the possibility of entangling the inner vessel 17 with any cables or wires which connect the inner vessel 17 with the outer vessel 16.

Figure 13:
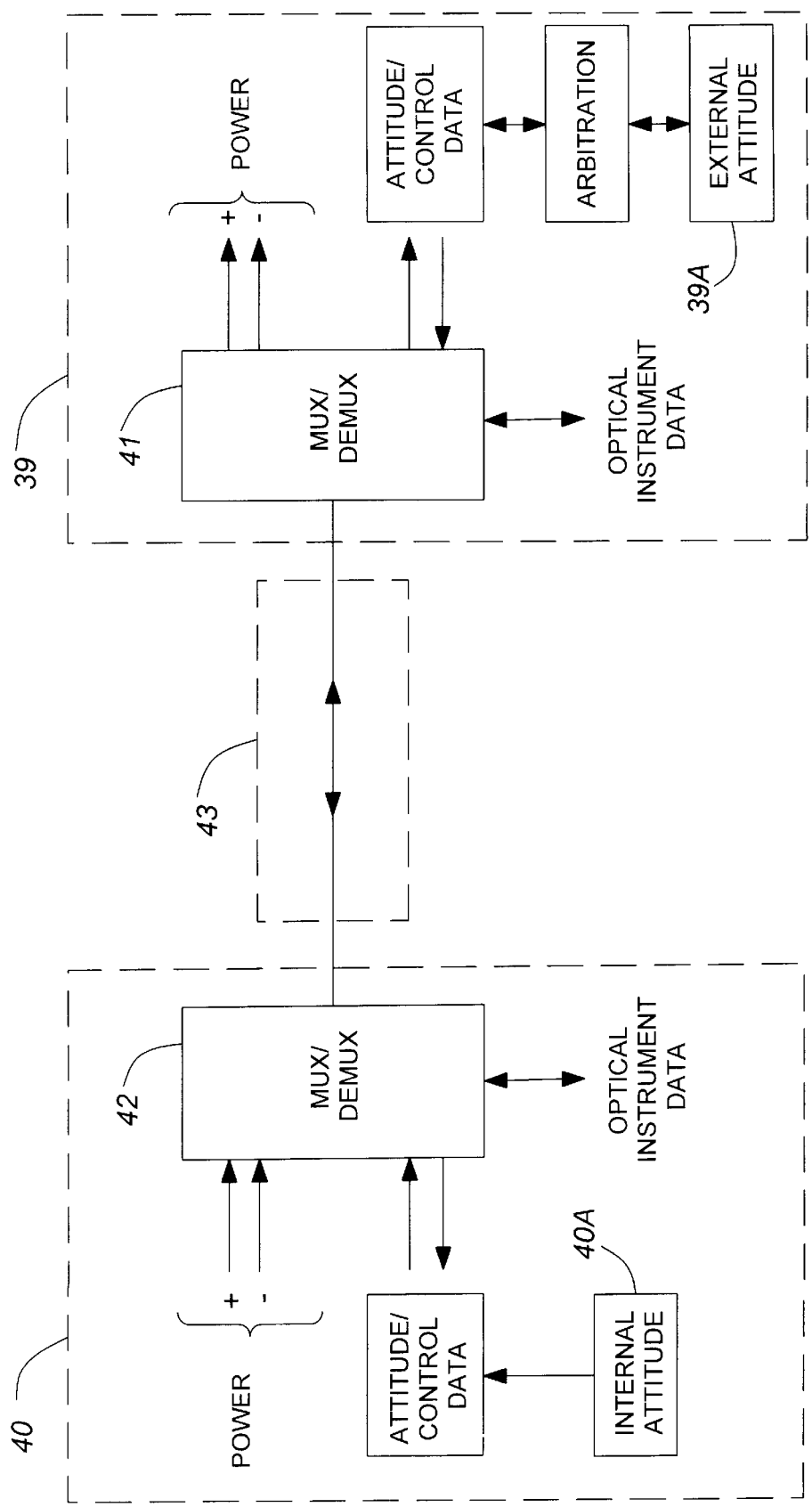
FIG. 13 is a block diagram of the power and data flow between the inner vessel circuitry and the circuitry external to the platform.

It should be noted that in this embodiment the bore 21 is located in the gap 35 between the data link conductive plates 33, 34. Also, it should be noted that the area of the contact surface 36 on the spacer studs 26 should be smaller than the width of the gap 35 to prevent arcing or a short circuit between the two data link conductive plates 33, 34. A data/power cable 37 is attached to the outer vessel 16 to feed power and send and receive data from the data link conductive plates. A block diagram of the power and data flow between the inner vessel circuitry 39 and the circuitry 40 external to the platform using power and data link 43 is shown in FIG. 13.

Inner vessel circuitry 39 includes a multiplexer/demultiplexer 41 while circuitry 40 external to the platform also includes a multiplexer/demultiplexer 42. Multiplexer/demultiplexer 41 demultiplexes the power and control signals transmitted form circuitry 40.

Multiplexer/demultiplexer 41 also multiplexes the optical instrument signal and the attitude/control data from the inner vessel circuitry 39 for transmission to the circuitry 40. The attitude/control data from the inner vessel circuitry can be feedback data needed for correction or the setting of the inner vessel's position relative to the first viewing port 19. The optical instrument data is generated by the optical instrument 20. If the optical instrument 20 is a video camera, the optical instrument data is a digital video signal. On the other hand, if the optical instrument is a point to point optical power and data link 43, the data to and from the optical instrument is multiplexed onto the data link for transport to and from the inner vessel.

On the other side of the power and data link 43, the multiplexer/demultiplexer 42 demultiplexes the optical instrument data and any attitude/control data that the inner vessel circuitry 39 may generate.

The multiplexer/demultiplexer 42 also multiplexes the power and the attitude/control data for transmission to the inner vessel circuitry 39.

It should be noted that the optical device 20 can be chosen from a multitude of devices. Video cameras can be used for undersea and aerial photography. An optical data link, using a laser or any other form of light requiring a stable platform could also be housed within the platform. Also, laser range finders or optical/laser targetting systems to be mounted on helicopters, armored vehicles and the like are also adaptable for use with the platform.

A person understanding this invention may now conceive of alternative structures and embodiments or variations of the above. All those which fall within the scope of the claims appended hereto are considered to be part of the present invention.

I claim:

1. A floated gimbaled optical platform comprising:

a vehicular mounted base;

a hollow sealed outer vessel fixed to the base and having a first optically transparent viewing port;

a hollow sealed inner vessel assembly centrally positioned within the outer vessel, the inner vessel assembly having: a second optically transparent viewing port generally aligned with the first optically transparent viewing port and an optical instrument mounted within the inner vessel assembly and optically aligned with the first transparent viewing port;

an optically transparent suspension fluid separating the inner vessel assembly and outer vessel, said suspension fluid having a density substantially equal to the inner vessel assembly;

means to assist in centrally positioning the inner vessel assembly within the outer vessel;

detection means to detect misalignment between the second transparent viewing port and the first transparent viewing port; and means to rotate the inner vessel assembly within the optically transparent suspension fluid;

wherein a detected misalignment between the first and second transparent viewing ports is corrected by rotating the inner vessel assembly;

the centre of gravity of the inner vessel assembly is substantially located at the physical centre of the inner vessel assembly; and the inner vessel assembly floats in the optically transparent suspension fluid in substantially neutral buoyancy.

2. A platform as claimed in claim 1 further including:

a bore through the outer vessel; and a bellows attached to the outer vessel;

wherein the optically transparent suspension fluid is allowed to flow to the bellows through the bore.

3. A platform as claimed in claim 2 wherein the outer vessel and inner vessel assembly are substantially spherical.

4. A platform as claimed in claim 3 wherein the means to assist in centrally positioning the inner vessel assembly comprises at least four spacing studs extending radially outward from the outer surface of the inner vessel assembly.

5. A platform as claimed in claim 4 wherein the spacing studs are formed with a low friction material.

6. A platform as claimed in claim 4 wherein the spacing studs are coated with a low friction material.

7. A platform as claimed in claim 4 wherein the optically transparent suspension fluid has low viscosity and is transparent to specific wavelengths of light including visible light.

8. A platform as claimed in claim 7 wherein the optically transparent suspension fluid is chosen from the group comprising mineral oil and a fluorinated hydrocarbon liquid.

9. A platform as claimed in claim 7 wherein the means to rotate the inner vessel within the optically transparent suspension fluid includes:

a microprocessor coupled to the detection means;

pump means located in the inner vessel and operated by the microprocessor; and a plurality of ejector nozzles coupled to the pump means through a plurality of valves, said valves being controlled by the microprocessor wherein the pump means and the plurality of valves are operated by the microprocessor based on input received from the detection means;

the pump means and the plurality of valves are operated by the microprocessor to cause selected ejection nozzles to eject suspension fluid to align the first and second viewing ports;

the pump means controllably drains in suspension fluid through a bore in the inner vessel;

the plurality of ejector nozzles are positioned on the outside of the inner vessel such that the inner vessel can rotate about any of three axes, by ejection of fluid through selected ejector nozzles, each of said three axes being orthogonal to the other two axes.

10. A platform as claimed in claim 7 wherein the means to rotate the inner vessel within the optically transparent suspension fluid includes:

a first set of electromagnets positioned on the outer vessel;

a second set of electromagnets positioned on the inner vessel assembly; and a microprocessor controlling both the first set and the second set of electromagnets;

wherein the microprocessor selectively activates and deactivates selected electromagnets based on input received from the detection means.

11. A platform as claimed in claim 9 wherein the detection means is chosen from the group including:

a) induction coils and corresponding antennae, the coils and antennae positioned such that the suspension fluid is between the coils and the antennae and such that fluctuations in the amplitude of modulated signals generated by the induction coils are detected and measured through the antennae and sent to the rotating means;

b) corresponding conductive plates positioned on the outer vessel and inner vessel assembly wherein fluctuations in the capacitance between corresponding conductive plates is measured and transmitted to the rotating means;

c) an internal gyroscopic system located within the inner vessel assembly and induction coils and antennae positioned such that the suspension fluid is between the coils and the antennae and such that fluctuations in the amplitude of modulated signals generated by the induction coils are detected and measured through the antennae and sent to the rotating means wherein differences between data generated by the gyroscopic system and the induction coils and antennae indicates a misalignment between the first and second viewing ports;

d) an internal gyroscopic system located within the inner vessel assembly and a reference gyroscopic system located outside the inner vessel assembly wherein differences between data generated by the internal gyroscopic system and the external gyroscopic system indicates a misalignment between the first and second viewing ports; and e) a three part system which determines an attitude of the inner vessel relative to an attitude of the outer vessel, said three part system comprising:

an internal attitude determining subsystem generating internal attitude data;

an external attitude determining subsystem generating external attitude data; and an arbitration subsystem which determines misalignments wherein the internal attitude determining subsystem determines the attitude of the inner vessel;

the external attitude determining subsystem determines the attitude of the outer vessel;

the arbitration subsystem is coupled to receive internal attitude data from the internal attitude determining subsystem and external attitude data from the external attitude determining subsystem; and the arbitration subsystem determines a misalignment between the first and second viewing ports based on the internal attitude data and the external attitude data.

12. A platform as claimed in claim 10 wherein the detection means is chosen from the group including:

a) induction coils and corresponding antennae, the coils and antennae positioned such that the suspension fluid is between the coils and the antennae and such that fluctuations in the amplitude of modulated signals generated by the induction coils are detected and measured through the antennae and sent to the rotating means;

b) corresponding conductive plates positioned on the outer vessel and inner vessel assembly wherein fluctuations in the capacitance between corresponding conductive plates is measured and transmitted to the rotating means;

c) an internal gyroscopic system located within the inner vessel assembly and induction coils and antennae positioned such that the suspension fluid is between the coils and the antennae and such that fluctuations in the amplitude of modulated signals generated by the induction coils are detected and measured through the antennae and sent to the rotating means wherein differences between data generated by the gyroscopic system and the induction coils and antennae indicates a misalignment between the first and second viewing ports;

d) an internal gyroscopic system located within the inner vessel assembly and a reference gyroscopic system located outside the inner vessel assembly wherein differences between data generated by the internal gyroscopic system and the external gyroscopic system indicates a misalignment between the first and second viewing ports; and e) a three part system which determines an attitude of the inner vessel relative to an attitude of the outer vessel, said three part system comprising:

an internal attitude determining subsystem generating internal attitude data;

an external attitude determining subsystem generating external attitude data; and an arbitration subsystem which determines misalignments wherein the internal attitude determining subsystem determines the attitude of the inner vessel;

the external attitude determining subsystem determines the attitude of the outer vessel;

the arbitration subsystem is coupled to receive internal attitude data from the internal attitude determining subsystem and external attitude data from the external attitude determining subsystem; and the arbitration subsystem determines a misalignment between the first and second viewing ports based on the internal attitude data and the external attitude data.

13. A platform as claimed in claim 11 wherein the optical instrument is chosen from a group consisting of a video camera, a laser range finder, an optical targetting system and an optical data link.

14. A platform as claimed in claim 12 wherein the optical instrument is chosen from a group consisting of a video camera, a laser range finder, an optical targetting system and an optical data link.

15. An optical platform system mounting and operating an optical instrument, the system including:

an external spherical vessel mounted on a vehicle and having a first optically transparent viewing port;

an internal spherical vessel contained within the external vessel and having a second optically transparent viewing port;

a stabilizer subsystem which stabilizes the internal vessel within the external vessel and maintains alignment between the first and second optically transparent viewing ports;

a power and data link between the external and internal vessel;

an optically transparent suspension fluid contained within the external vessel and in which the internal vessel floats in substantially neutral buoyancy;

wherein the internal vessel is positioned in a substantially central position within the external vessel.

16. A platform as claimed in claim 15 further including:

a bore through the external vessel; and a bellows attached to the external vessel;

wherein the optically transparent suspension fluid is allowed to flow to the bellows through the bore.

17. An optical platform as claimed in claim 15 wherein the stabilizer subsystem includes:

induction coils positioned on the outer vessel;

a plurality of antennae positioned in the inner vessel;

a microprocessor coupled to the antennae wherein the induction coils generate a signal;

the antennae detect and measure changes in the signal generated by the induction coils; and the microprocessor determines misalignment between the first and second viewing ports based on changes in the signal detected by the antennae.

18. An optical platform as claimed in claim 15 wherein the stabilizer subsystem includes;

a first set of conductive plates positioned on the outer vessel;

a second set of conductive plates positioned on the inner vessel;

a plurality of sensors which measure changes in capacitance between the first and second set of conductive plates;

a microprocessor coupled to the plurality of sensors wherein the microprocessor determines misalignment between the first and second viewing ports based on changes in the signal detected by the sensors.

19. An optical platform as claimed in claim 17 wherein the stabilizer subsystem includes:

a plurality of spacing studs extending radially outward;

a plurality of ejector nozzles mounted outside the internal vessel;

a pump located within the internal vessel and controlled by the microprocessor;

a plurality of valves coupling the ejector nozzles to the pump, said valves being controlled by the microprocessor;

wherein the pump and the plurality of valves are operated by the microprocessor based on detecting a misalignment between the first and second viewing port; and the pump and the plurality of valves are operated by the microprocessor to cause selected ejector nozzles to controllably eject suspension fluid to align the first and second viewing ports.

20. An optical platform as claimed in claim 18 wherein the stabilizer subsystem includes:

a plurality of spacing studs extending radially outward;

a plurality of ejector nozzles;

a pump located within the internal vessel and controlled by the microprocessor;

a plurality of valves coupling the ejector nozzles to the pump, said valves being controlled by the microprocessor;

wherein the pump and the plurality of valves are operated by the microprocessor based on detecting a misalignment between the first and second viewing port;

the pump and the plurality of valves are operated by the microprocessor to cause selected ejector nozzles to controllably draw in and eject suspension fluid to align the first and second viewing ports.

21. An optical platform as in claim 17 wherein the stabilizer subsystem includes;
   a first set of electromagnets positioned on the outer vessel; and
   a second set of electromagnets positioned on the inner vessel;
   wherein
      both sets of electromagnets are controlled by the microprocessor and
      the microprocessor selectively activates and deactivates selected electromagnets to counteract a detected misalignment between the first and second viewing ports.

22. An optical platform as in claim 18 wherein the stabilizer subsystem includes:
   a first set of electromagnets positioned on the outer vessel; and
   a second set of electromagnets positioned on the inner vessel;
   wherein
      both sets of electromagnets are controlled by the microprocessor and
      the microprocessor selectively activates and deactivates selected electromagnets to counteract a detected misalignment between the first and second viewing ports.

23. An optical platform as claimed in claim 15 where the power and data link comprises at least one thin cable such that the internal vessel can freely rotate within the external vessel.

24. An optical platform as claimed in claim 19 wherein the power and data link comprises:
   a pair of data link conductive plates attached to an inner surface of the external vessel and coupled to a power source and a data source outside the external vessel;
   a contact surface on each spacing stud, each contact surface being coupled to receiving circuitry within the internal vessel;
   wherein both power signals and data signals are multiplexed for transmission to the internal vessel through the power and data link.

25. An optical platform as claimed in claim 18 wherein the power and data link comprises:
   a pair of data link conductive plates attached to an inner surface of the external vessel and coupled to a power source and a data source outside the external vessel; and
   a contact surface on each spacing studs each contact surface being coupled to receiving circuitry within the internal vessel;
   wherein both power signals and data signals are multiplexed for data exchange between the internal vessel and outside circuitry through the power and data link.

* * * * *